United States Patent
Tsubata et al.

[11] Patent Number: 6,155,396
[45] Date of Patent: Dec. 5, 2000

[54] CLUTCH HYDRAULIC CONTROLLER

[75] Inventors: Yoshimichi Tsubata; Tomoaki Ishikawa; Tamotsu Kotegawa; Eiji Ohyama, all of Wako, Japan

[73] Assignee: Honda Giken Kogyo Kabushiki Kaisha, Tokyo, Japan

[21] Appl. No.: 09/375,380

[22] Filed: Aug. 17, 1999

[30] Foreign Application Priority Data

Aug. 26, 1998 [JP] Japan .................................. 10-239691

[51] Int. Cl.⁷ ................................................. F16H 61/00
[52] U.S. Cl. ..................................... 192/85 R; 192/103 F
[58] Field of Search ............................ 192/85 R, 103 F; 477/906, 907, 48

[56] References Cited

U.S. PATENT DOCUMENTS

| | | | |
|---|---|---|---|
| 4,995,283 | 2/1991 | Sawasaki et al. | 477/48 |
| 5,183,439 | 2/1993 | Yumoto et al. | 474/28 |
| 5,665,023 | 9/1997 | Aoki et al. | 477/906 X |

Primary Examiner—Rodney H. Bonck
Attorney, Agent, or Firm—Arent Fox Kintner Plotkin & Kahn, PLLC

[57] ABSTRACT

Line pressure is adjusted by one valve for supplying the pressure to control the engagement of a clutch in normal and abnormal operating conditions. In the normal operating condition, the valve control pressure which is controlled by a starting clutch control valve 41 is used for the control of a clutch pressure control valve 42, so the line pressure from a line 61b is adjusted to control the engagement of the starting clutch 5. If there is a breakdown, two electrically controlled valves 41 and 45 are turned off, and the line pressure is applied through another line 64. As a result, the spool of a shift restriction valve 43 is shifted to the left, so the hydraulic oil is supplied to a pitot flange 51. In this condition, the pressure (correspondent pressure) which corresponds to the rotational speed of the engine is supplied as a signal pressure from a pitot pipe 53 through lines 66 and 67 to the shift restriction valve 43. This hydraulic controller adjusts the line pressure in the line 61b by using this correspondent pressure for controlling the engagement of the starting clutch 5.

6 Claims, 6 Drawing Sheets

CLUTCH HYDRAULIC CONTROLLER

RELATED APPLICATIONS

This application claims the priority of Japanese Patent Application No.10-239691 filed on Aug. 26, 1998, which is incorporated herein by reference.

FIELD OF THE INVENTION

The present invention relates generally to a hydraulic controller which controls a clutch, and particularly to a hydraulic controller which is used for a vehicular starting clutch. This hydraulic controller ensures the movement of the vehicle even while the circuit of the controller is experiencing a breakdown.

BACKGROUND OF THE INVENTION

In general, a vehicular transmission comprises a speed change mechanism and a clutching mechanism (also referred to as "a starting clutch"). The speed change mechanism includes an input member, which is driven by an engine, and an output member, which is connected to wheels of a vehicle. The starting clutch controls the mechanical power transmission for starting, driving and stopping the vehicle in relation with the engagement and disengagement of the clutch. In general, the engagement of the clutch is controlled hydraulically, and in most clutching mechanisms, the hydraulic control for the operation of the clutch is carried out, for example, in relation to the rotational speed of the engine, which is detected by a sensor, and an electromagnetic valve is actuated in correspondence with the rotational speed detected.

To avoid a failure in the hydraulic control when an electrical breakdown (e.g., a breakdown of the electrical control system) or an open slick (i.e., the condition where the spool of a valve sticks in its open state) occurs, such hydraulic controllers are often equipped with a backup mechanism, in which a signal pressure is generated in correspondence with the rotational speed of the engine, and the hydraulic control is carried out by using this signal pressure.

Figure 5:
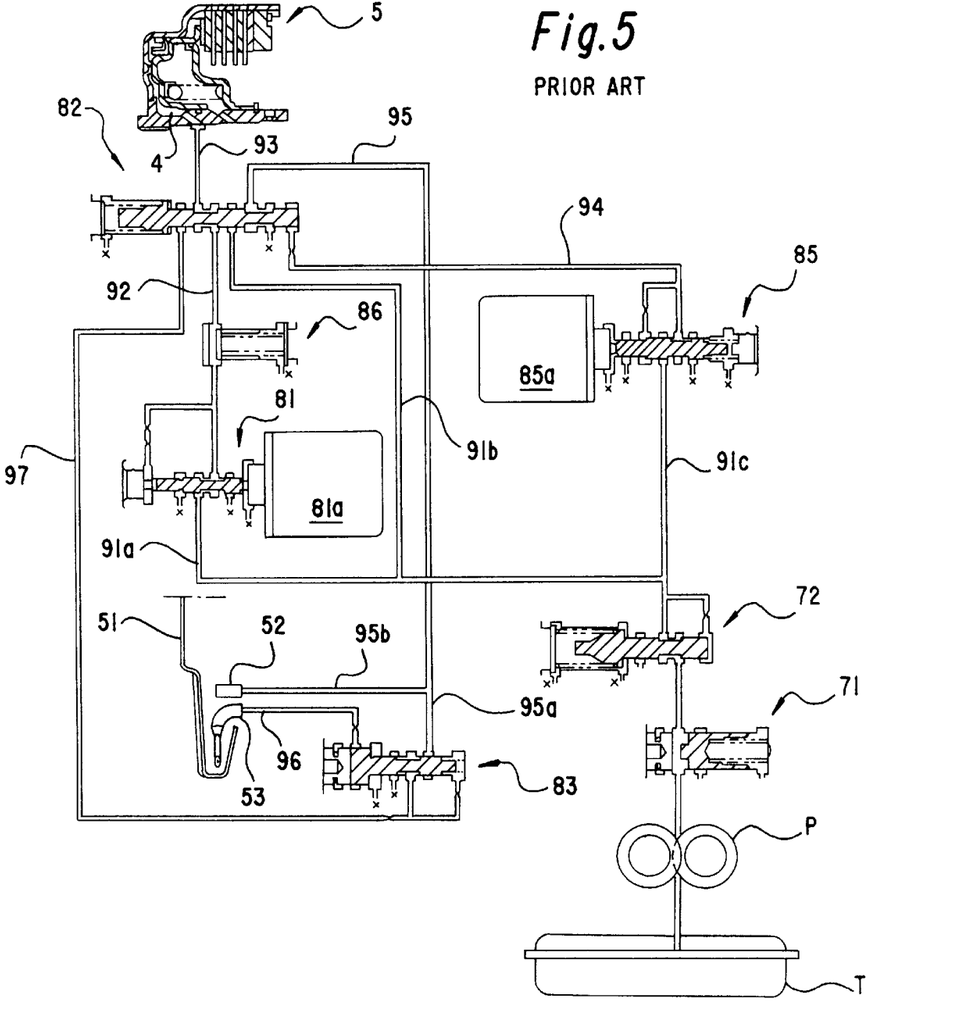
FIG. 5 is a hydraulic circuit diagram showing an example of prior-art hydraulic controller.

As such a backup mechanism, a mechanism which uses a pitot tube is known and described as an example of prior art in Japanese Patent Application No. H10(1998)-57827, which was applied by the same applicant as this patent application. FIG. 5 shows a starting clutch controller of prior art which uses a pitot tube. In this hydraulic circuit, a pitot flange 51 is provided in a direct connection to the output shaft of the engine, and a pitot tube 53 is provided against the rotational direction in the lubrication oil which accumulates in the oil chamber of the pitot flange 51. The pitot tube 53 extracts the dynamic pressure of the lubrication oil, which moves in the pitot flange along with the rotation of the engine, as a signal pressure which corresponds to the rotational speed of the engine. In the following paragraph, this hydraulic circuit used for controlling the starting clutch is described in detail.

In this controller, the pressure of the hydraulic oil supplied from a tank T by a pump P is adjusted to a line pressure PL by regulator valves 71 and 72, and this line pressure PL is supplied to a starting clutch control value 81. In the starting clutch control valve, a control pressure is produced in correspondence with the electrical current applied to the linear solenoid 81a of this valve. This control pressure is supplied through an accumulator 86 and a shift restriction valve 82, which are provided on a line 92 to the starting clutch 5, to control the engagement of the clutch.

On the other hand, the line pressure PL is also supplied through another line 91c to a shift control valve 85, and a shift control pressure is produced in correspondence with the electrical current applied to the linear solenoid 85a of this valve. This shift control pressure is supplied through a line 94 to a shift restriction valve 82 as a signal pressure. The shift control pressure is used as the pressure for hydraulic control of the widths of the drive and driven pulleys of the belt-type continuous speed change mechanism, which is not shown in the drawing.

Figure 6:
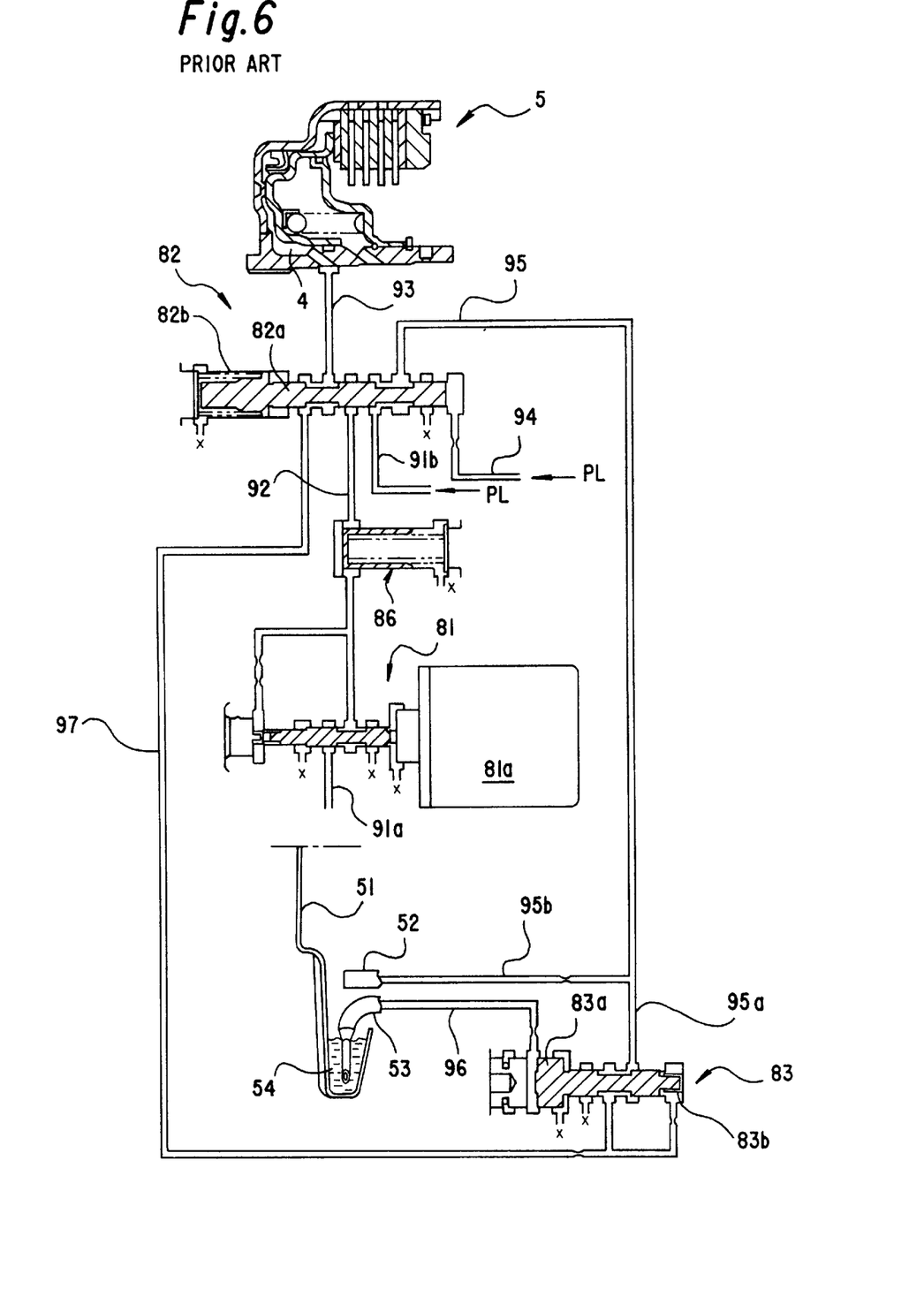
FIG. 6 is an illustration showing the actuation of respective valves when a major hydraulic circuit constituting the prior-art hydraulic controller experiences a breakdown.

As shown in FIG. 6 in detail, the shift restriction valve 82 includes a spool 82a, which is biased rightward by a spring 82b, and the shift control pressure creates a thrust which pushes the spool 82a leftward. The position of the spool 82a in the shift restriction valve 82 is controllable in correspondence with the magnitude of the shift control pressure, so this pressure is able to control the switching of the circuits for the starting clutch, the adjustment of the valve opening, etc.

This controller is designed such that if it is determined that there is a breakdown in the circuits of the hydraulic controller, for example, the starting clutch control valve 81 or the electrical circuit breaks down, then the current applied to the shift control valve 85 is turned OFF to fix the shift control valve 85 to its open condition. As a result, the line 94 receives the same line pressure as the line 91. FIG. 6 shows all the valves in their breakdown mode.

In this mode, the spool 82a of the shift restriction valve 82 is pushed leftward against the spring 82b by the line pressure which is applied through the line 94. As shown in the drawing, the line 92 and the line 93, which had been in fluid communication, are now closed to each other while the line 91b and the line 95 are in fluid communication with each other. In this condition, the line pressure in the line 91b acts on a pitot regulator valve 83 through a line 95, and portion of the hydraulic oil is supplied through a line 95b that is branched from the line 95 to an oil supply pipe 52, from which the oil is discharged into the oil chamber of the pitot flange 51.

The hydraulic oil 54 which accumulates in the oil chamber of the pitot flange 51 is rotated along with the pitot flange 51 in correspondence with its viscosity as the pitot flange 51 is directly connected to the output shaft of the engine. The detector portion at the tip of the pitot tube 53 is positioned in this hydraulic oil in the direction against the rotation of the flange. Thus, the pitot tube 53 detects the dynamic pressure which is proportional to the flow speed of the hydraulic oil, which is rotating. As a result, the pressure (signal pressure) which corresponds to the rotational speed of the engine is supplied from the pitot tube 53 through a line 96 to the pitot regulator valve 83.

The pitot regulator valve 83 includes a spool 83a, which is biased leftward in the drawing by a spring 83b, and the above mentioned signal pressure (also referred to as "the pitot pressure" in the following) which corresponds to the rotational speed of the engine generates a thrust rightward for the spool. Thus, the position of the spool 83a is controlled in correspondence with the rotational speed of the engine. Therefore, the pitot regulator valve 83 regulates the line pressure in the line 95 in correspondence with the pitot pressure, i.e., the signal pressure, and supplies the pressure which corresponds to the rotational speed of the engine, through the lines 97 and 93 to the starting clutch 5.

In this clutch control circuit, the pitot regulator valve 83 substantially closes the fluid communication between the lines 95 and 97 while the rotational speed of the engine is relatively low, for example, when the vehicle is in idling condition. In this condition, the clutch is in the disengaged condition, so the vehicle will not start. When the rotational speed of the engine is increased a little, i.e., the accelerator pedal is stepped down a little., this valve opens partially, so the vehicle will start gradually. When the accelerator pedal is stepped further downward to increase the rotational speed of the engine, the clutch is engaged completely, and the vehicle is able to travel continuously.

By the provision of such a backup mechanism, the vehicle can start and stop gradually even when the hydraulic controller for the clutch experiences a failure because of, for example, a breakdown in the hydraulic circuit of the hydraulic controller including the starting clutch or a breakdown in the electrical control system.

However, in this type of backup mechanism, the gain adjustment of the clutch control pressure (i.e., the adjustment of the clutch control pressure against the signal pressure) involves the adjustment of not only the: spool of the starting clutch control valve 81 but also that of the shift restriction valve 82. Also, the gain adjustment of the clutch pressure for the abnormal condition requires the adjustment of the two spools which are in the shift restriction valve 82 and the pitot regulator valve 83. Therefore, a number of man-hours must be spent for adjusting and setting the backup mechanism to keep an appropriate balance in these valves both for the normally operating condition and for the abnormal condition.

In addition, in this hydraulic circuit, the clutch control pressure, which has been already adjusted for controlling the clutch, must pass through an additional valve (e.g., the shift restriction valve 82 in the drawing) in either normal or abnormal condition. Therefore, there is a concern that the existence of such a valve increases the possibility of oil leak and resultant pressure loss especially around this valve and the oil passages connected to it (e.g., the lines 92, 95 and 97).

Moreover, this hydraulic circuit of prior art is constructed such that the clutch control pressure, which actuates the starting clutch, passes through the starting clutch control valve 81 (in the normal condition) and the pitot regulator valve 83 (in the abnormal condition). As a result, for example, if the engine is replaced with another one which has a larger output power, and therefore the capacity of the clutch must be increased, then these valves must be also replaced to increase the capacities as well as the capacity of the linear solenoid valve 81*a*. This is another disadvantage.

SUMMARY OF THE INVENTION

It is an object of the present invention to provide a controller which uses an electrically produced hydraulic pressure for the pressure control required for engaging a clutch and which is also capable of utilizing a mechanically produced hydraulic pressure for the pressure control required for engaging the clutch.

Especially, it is another object of the present invention to provided a controller which enables the pressure control required for engaging a clutch with a mechanically produced hydraulic pressure when there is a failure in the circuit which produces electrically the pressure necessary for the clutch engagement.

It is yet another object of the present invention to provide a controller which is easy to make the above mentioned gain adjustment for producing electrically or mechanically the pressure required for the clutch engagement control.

In order to achieve these objectives, the present invention provides a clutch hydraulic controller which comprises regulator valve means, an electrically controlled valve (e.g., the starting clutch control valve 41 described in the following embodiment), correspondent pressure generating means (e.g., the pitot flange 51, the pitot pipe 53, etc.), a clutch pressure control valve, and a clutch pressure control valve. The regulator valve means adjusts and sets a line pressure (PL) which is the original pressure used for control, and the electrically controlled valve produces a valve control pressure in response to an electrical control signal. The correspondent pressure generating means produces mechanically a correspondent pressure that corresponds to the rotational speed of the engine, and the clutch pressure control valve adjusts the line pressure by using the valve control pressure or the correspondent pressure and supplies this adjusted line pressure to a hydraulic actuator which actuates the clutch. The fault determining means determines whether there is a fault in the hydraulic controller. As long as the hydraulic controller is operating normally, the line pressure is adjusted by the valve control pressure to set the clutch control pressure. However, if the determining means determines that there is a breakdown in the hydraulic controller, then the line pressure is adjusted by the above mentioned correspondent pressure instead of the valve control pressure to set the clutch control pressure. This clutch control pressure is then supplied to the hydraulic actuator of the clutch (e.g., the cylinder chamber 4 of the clutch 5).

This clutch hydraulic controller controls the clutch pressure control valve by the valve control pressure supplied from the electrically controlled valve in normal operating condition (this "normal operating condition" excludes the condition where the hydraulic controller is experiencing a breakdown. This phrase is used in the following sections to indicate the same meaning defined here) and adjusts and set the line pressure by the clutch pressure control valve to actuate the hydraulic actuator of the clutch. However, if the hydraulic controller is determined to be experiencing a breakdown (a failure event), then the correspondent pressure, which is produced by the correspondent pressure generating means and which corresponds to the rotational speed of the engine, instead of the valve control pressure from the electrically controlled valve is supplied to the clutch pressure control valve. Now, the clutch pressure control valve is controlled by this pressure, which acts as a signal pressure, and the line pressure is adjusted and set appropriately and supplied to the hydraulic actuator of the clutch. Either in the normal operating condition or in an event of failure, the pressure to the clutch is achieved by adjusting and setting the line pressure with the clutch pressure control valve. Therefore, basically, the above mentioned gain adjustment of the clutch requires only the adjustment of the spool of this clutch pressure control valve. No other adjustment is necessary on the other valves.

The clutch control pressure, which is controlled by this clutch pressure control valve, is supplied directly to the hydraulic actuator of the clutch, so there is no redundant oil supply passages which lead to other valves for this purpose. With a relatively few valves and oil passages, this hydraulic controller performs the hydraulic control at a high accuracy with a relatively small possibility of oil leak and pressure loss.

Furthermore, the hydraulic circuit of the clutch hydraulic controller according to the present invention is constructed such that the electrically controlled valve and the correspondent pressure generating means are each to provide a signal pressure which controls the valve opening of the clutch pressure control valve, and that each signal pressure is not directly supplied to the clutch as the clutch control pressure.

This design of the hydraulic controller is advantageous when, for example, the capacity of the clutch must be increased because of an engine replacement for increasing the output power. In this hydraulic controller, simply, the capacity of the clutch pressure control valve, which adjusts the line pressure, should be increased. There is no need to increase the capacities of the electrically controlled valve and the correspondent pressure generating means, and it is not necessary to replace the linear solenoid for a larger power.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DESCRIPTION OF THE PREFERRED EMBODIMENTS

Figure 1:
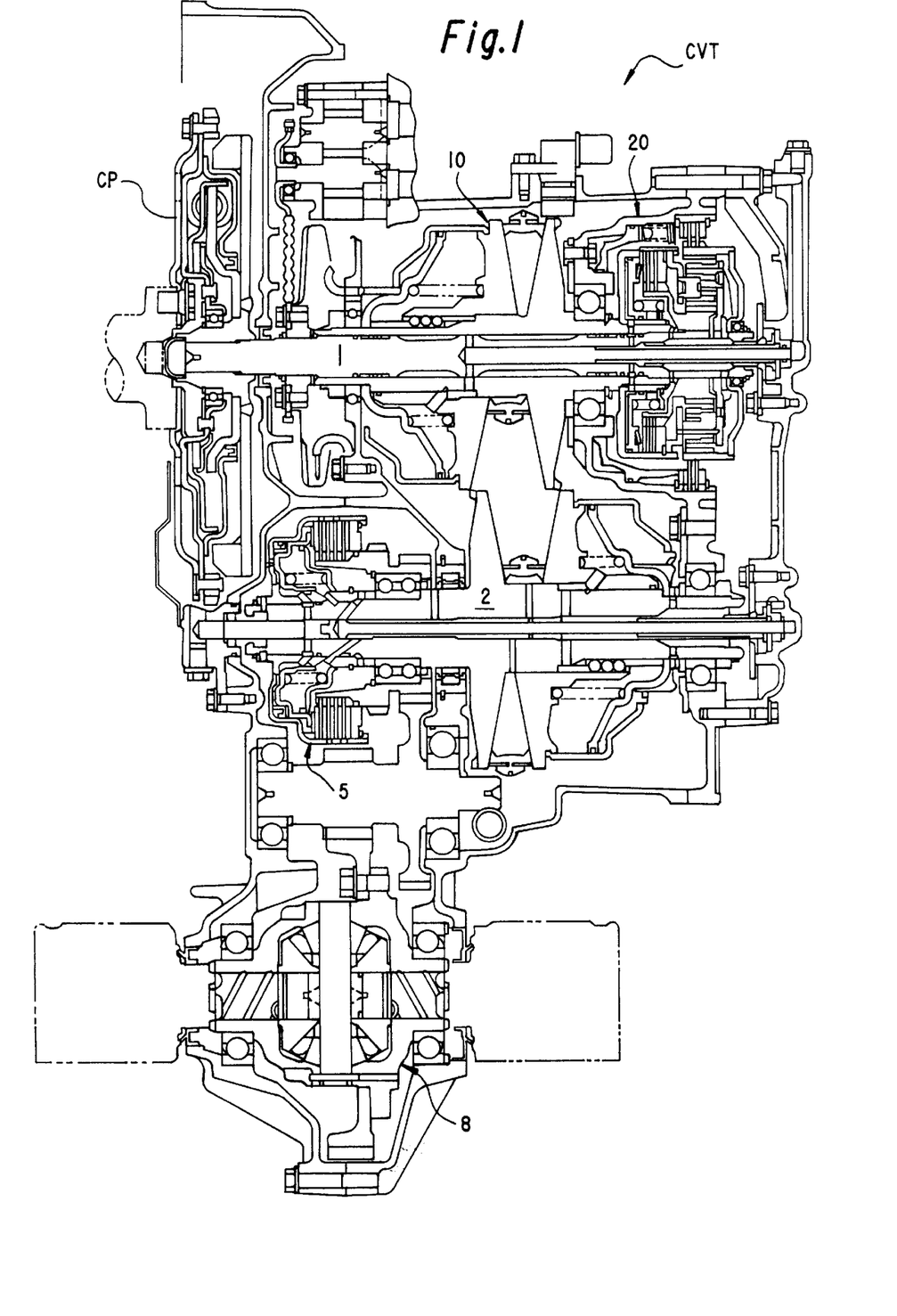
FIG. 1 is a cross-sectional view showing a continuously variable transmission which is equipped with a hydraulic controller according to the present invention.
Figure 2:
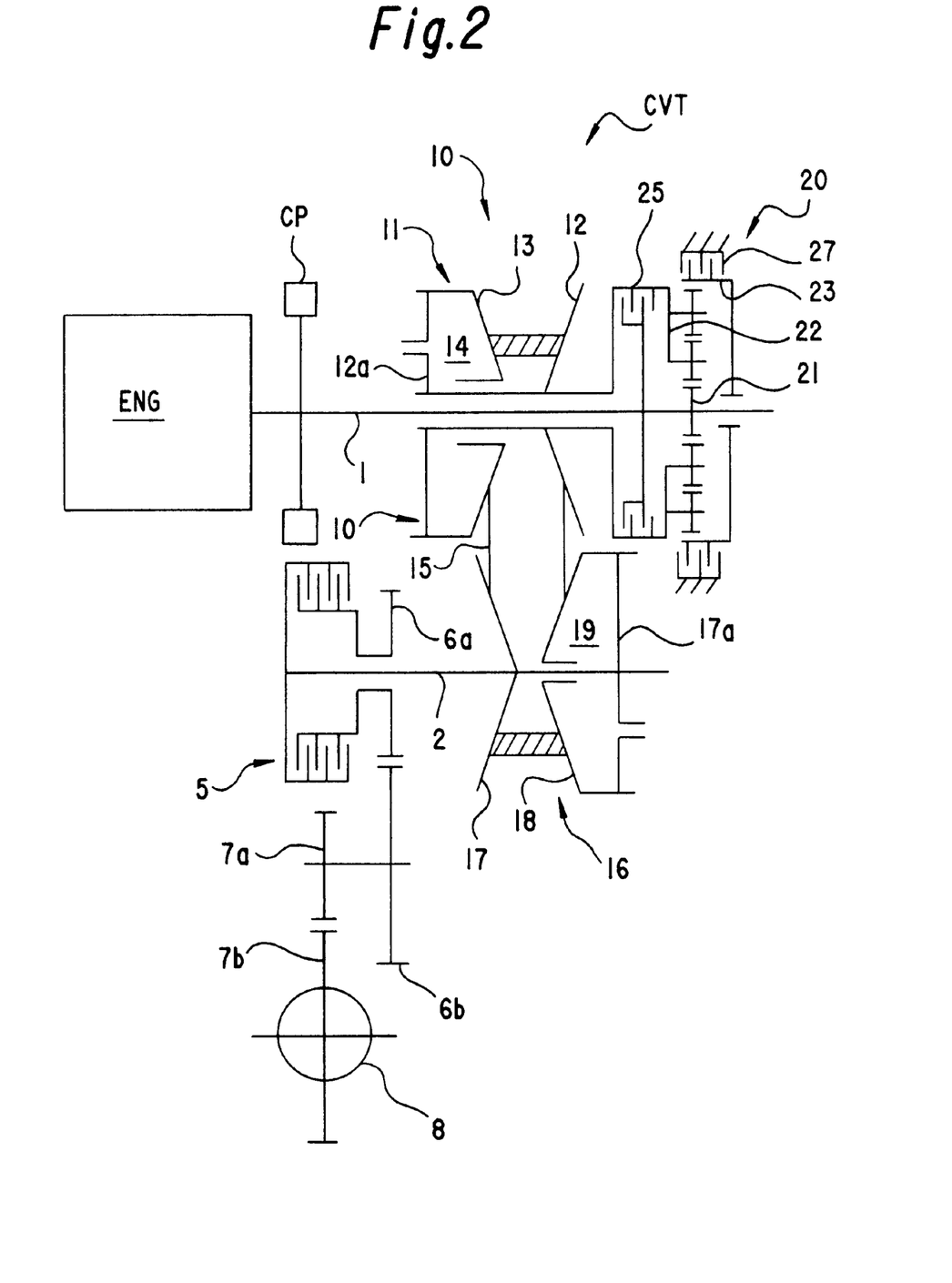
FIG. 2 is a schematic diagram showing the construction of the mechanisms for power transmission of the transmission.

FIGS. 1 and 2 show the construction of a continuously variable transmission CVT, which is equipped with a hydraulic controller according to the present invention. This continuously variable transmission CVT is a belt-type continuously variable transmission which uses a metal V-belt, and it comprises a metal V-belt mechanism 10, which is disposed between the input shaft 1 and the countershaft 2 of the transmission, a planetary gear type forward-reverse selector mechanism 20, which is disposed between the input shaft 1 and the drive pulley 11 of the metal V-belt mechanism 10, and a starting clutch 5, which is disposed between the countershaft 2 and the output member (including a differential mechanism 8) of the transmission. This continuously variable transmission CVT is used on a vehicle, so the input shaft 1 is connected through a coupling mechanism CP with the output shaft of the engine ENG, and the power transmitted to the differential mechanism 8 is used for driving the right and left wheels of the vehicle.

The metal V-belt mechanism 10 comprises the drive pulley 11, which is disposed over the input shaft 1, a driven pulley 16, which is disposed on the countershaft 2, and the metal V-belt 15, which is disposed around these pulleys 11 and 16.

The drive pulley 11 comprises a stationary pulley half 12, which is disposed rotatably over the input shaft 1, and a movable pulley half 13, which is movable with respect to the stationary pulley half 12 in the axial direction of the pulley 11. On the outside of the movable pulley half 13, a drive-side cylinder chamber 14 is defined by a cylinder wall 12a which is fixed to the stationary pulley half 12. The pressure supplied into the cylinder chamber 14 generates a thrust which shifts the movable pulley half 13 in the axial direction of the drive pulley.

The driven pulley 16 comprises a stationary pulley half 17, which is fixed on the countershaft 2, and a movable pulley half 18, which is movable with respect to the stationary pulley half 17 in the axial direction of the pulley. On the outside of the movable pulley half 18, a driven-side cylinder chamber 19 is defined by a cylinder wall 17a which is fixed to the stationary pulley half 17. The pressure supplied into the cylinder chamber 19 generates a thrust which shifts the movable pulley half 18 in the axial direction of the driven pulley.

The hydraulic pressure which is supplied into these cylinder chambers 14 and 19 is controlled to generate appropriate lateral thrusts in these two pulleys, which thrusts change the widths of the V grooves of the drive and driven pulleys 11 and 16 without any slip of the belt 15 and thereby change the pitch radii of the respective pulleys for the V belt 15 to vary the speed change ratio of the transmission continuously.

The planetary gear type forward-reverse selector mechanism 20 comprises a double-pinion planetary gear train. This planetary gear train comprises a sun gear 21, which is connected to the input shaft 1, a carrier 22, which is connected to the stationary pulley half 12 of the drive pulley 11, arid a ring gear 23, which can be held against rotation by a reverse brake 27. The planetary gear train also comprises a forward clutch 25, which can connect the sun gear 21 and the ring gear 23. When this forward clutch 25 is engaged, all the gears 21, 22 and 23 rotate together with the input shaft 1 as a one body, and the drive pulley 11 is driven in the same direction as the input shaft 1 (i.e., the forward direction of the vehicle). On the other hand, if the reverse brake 27 is engaged, the ring gear 23 is held stationary, so the carrier 22 rotates in the direction opposite to that of the sun gear 21, and the drive pulley 11 is driven in the direction opposite to that of the input shaft 1 (i.e., the reverse direction).

The starting clutch 5 is a clutch which controls the power transmission between the countershaft 2 and the output members of the transmission. When the starting clutch 5 is engaged, it is possible to transmit the power therebetween. The pressure supplied to the starting clutch 5 (clutch control pressure) is controlled to adjust the hydraulic engaging force of the clutch so that the torque transmission capacity (torque capacity) between the input side and the output side of the clutch is controllable. Therefore, when the starting clutch 5 is engaged, the output of the engine, after undergoing the speed change by the metal V-belt mechanism 10, is transmitted through gears 6a, 6b, 7a and 7b to the differential mechanism 8 and then divided and transmitted by the differential mechanism 8 to the right and left wheels (not shown). When the starting clutch 5 is released, this power transmission is not carried out, and the transmission is in the neutral condition.

Figure 3:
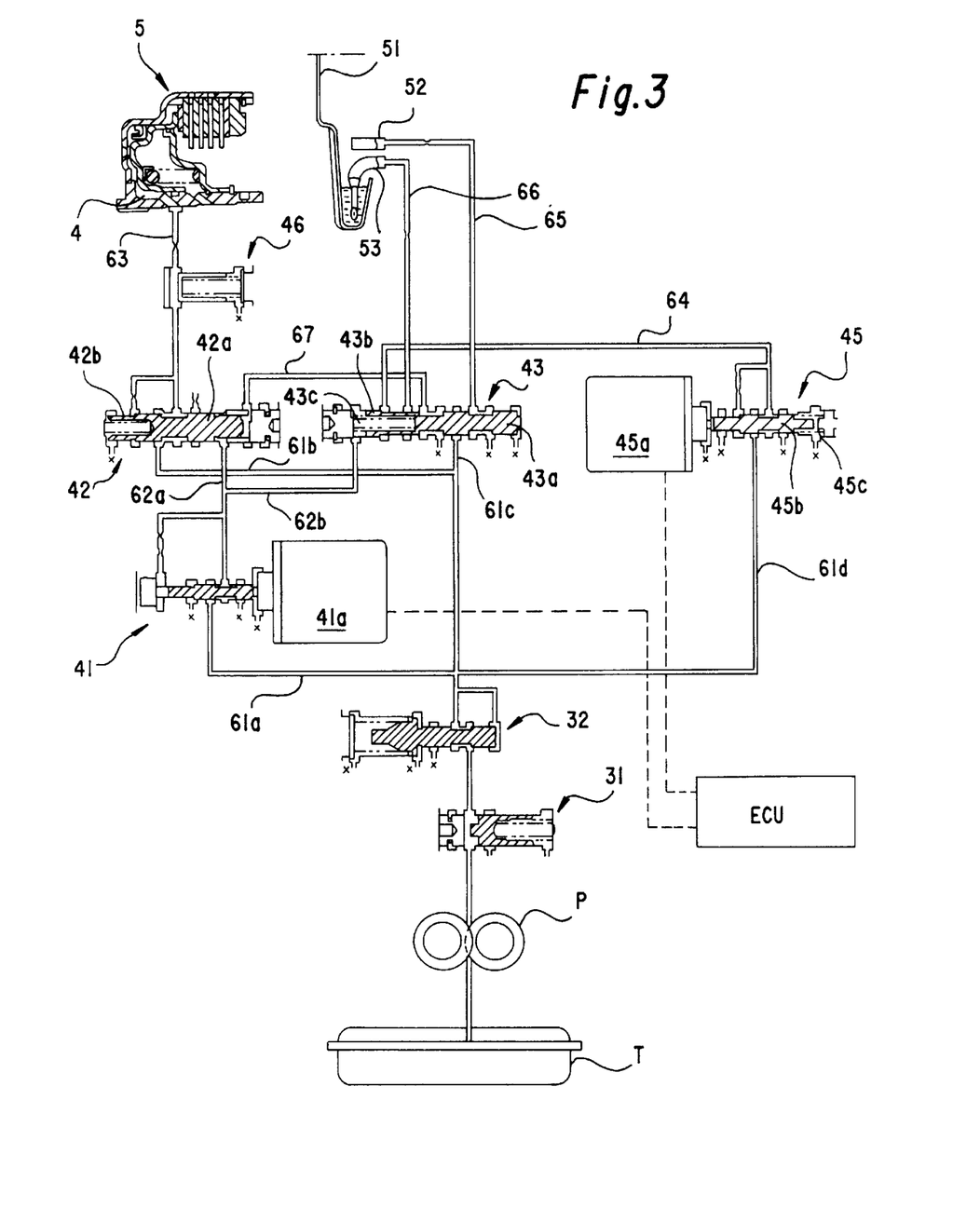
FIG. 3 is a hydraulic circuit diagram showing the construction of an embodiment of hydraulic controller according to the present invention.
Figure 4:
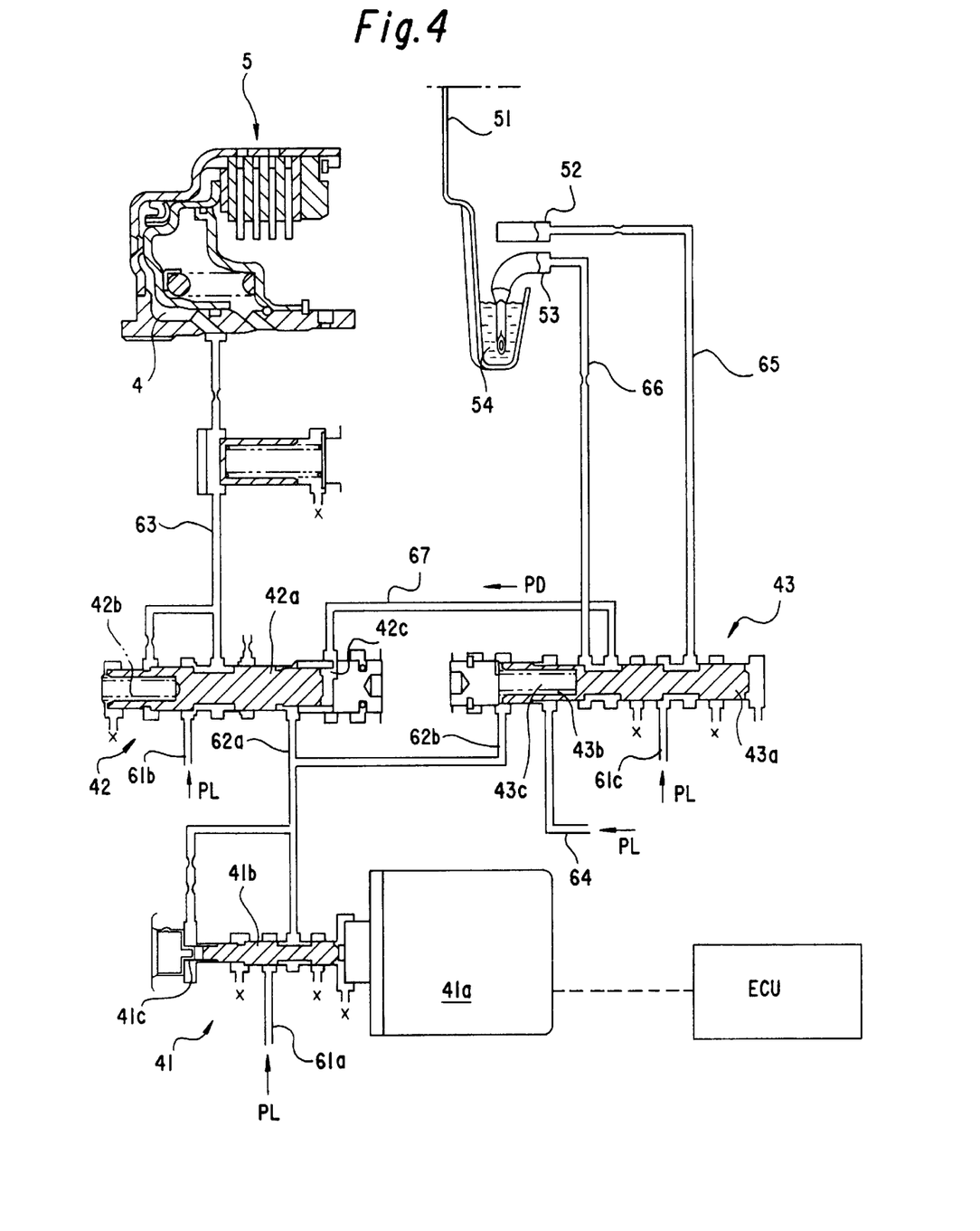
FIG. 4 is an illustration showing the actuation of respective valves when a major hydraulic circuit constituting the hydraulic controller experiences a breakdown.

A hydraulic controller according to the present invention is to control the engagement of the starting clutch 5 by means of a clutch pressure control valve in the normal operating condition as well as in an event of failure. The construction of this hydraulic controller (also referred to as "the clutch hydraulic controller") is described in reference to FIGS. 3 and 4. FIG. 3 shows the whole of the circuit of the clutch hydraulic controller with the respective valves in the normal operating condition while FIG. 4 shows the condition of only major valves of the clutch hydraulic controller while the controller is experiencing a breakdown. Each "X" mark in the drawings represents a connection to drainage.

In this hydraulic controller, as shown in FIG. 3, the hydraulic coil which is sucked from a tank T by a pump P is supplied to regulator valves 31 and 32 (regulator valve means), which adjusts the pressure of the oil to a line pressure PL and supplies this pressure to the succeeding lines 61 (61a, 61b and 61c). This line pressure is the original control pressure.

The line pressure PL is supplied through the line 61a to a starting clutch control valve 41, which in turn produces a desired valve control pressure in response to the electrical current applied to the linear solenoid 41a of this valve 41 (controlled by an electrical control signal). This valve control pressure is supplied through a line 62a to a clutch pressure control valve 42.

The clutch pressure control valve 42 includes a spool 42a, which is biased rightward by a spring 42b, and the valve control pressure acts on the spool 42a to produce a leftward thrust. As a result, the position of the spool 42a is controllable in correspondence to the magnitude of the valve control pressure, which is set by the starting clutch control valve 41. In this condition, the valve opening of the line 61b is controllable as desired for the operation of the transmission, and the line pressure PL is adjusted and then supplied through a line 63 to the clutch 5 for the engagement control of the clutch.

The starting clutch control valve 41 is controlled by an electrical control signal being output in response to the information provided by a rotational speed detector (not shown), which detects the rotational speed of the input shaft 1 of the transmission. Therefore, the engagement control of the starting clutch is carried out appropriately in correspondence to the rotational speed of the input shaft of the transmission, i.e., the rotational speed of the engine.

The valve control pressure is also supplied through the line 62b to a shift restriction valve 43. The shift restriction valve 43 comprises a spool 43a, which is biased rightward by a spring 43b, and an oil chamber 43c, which accommodates the spring 43b and creates a rightward thrust on the spool when it receives the above mentioned valve control pressure through the line 62b as a control back pressure.

To the shift restriction valve 43, the output of a shift control valve 45 is connected through a line 64. The shift control valve 45 supplies a desired control pressure into the line 64 when the electrical current applied to the linear solenoid 45a of this valve is controlled appropriately. This control pressure is supplied through a line (not shown in the drawing) as a signal pressure to a shift valve, which controls the pressures supplied into the cylinder chambers of the drive and driven pulleys 11 and 16, respectively, for the control of the speed change ratio in the normal operating condition. The shift restriction valve 43 is designed such that the spool 43a never shifts leftward as long as it is receiving a range of pressure supplied through the line 64 in the normal operating condition. In other words, the spool 43a of the shift restriction valve 43 is maintained to the right side because the rightward thrust generated by the spring 43b and by the valve control pressure acting on the spool in the oil chamber 43c overpowers the leftward thrust which is generated by the pressure supplied through the line 64 in the normal operation condition.

In this hydraulic control circuit, when a determining means ECU determines that there is a fault, it turns OFF the electrical currents applied to the starting clutch control valve 41 and to the shift control valve 45. This fault determination is carried out for a breakdown in the electrical control system. For example, a failure of the electrical power supply to the electromagnetic valves is determined as a fault. Also, if the real speed change ratio, which is determined from the rotational speeds of the drive and driven pulleys, is not within a predetermined range for the value of the command signal sent to the transmission in the speed change control, then this condition is determined as a fault. Furthermore, the determining means ECU, which comprises a computer mounted on the vehicle, evaluates in the fault determination such signals as provided by a pressure detector which detects the pressure of each line and a spool position detector which detects the position of the spool in each linear solenoid valve.

Here, the actuation of each valve at the event of such a breakdown is described in reference to FIG. 4. When the electrical current to the starting clutch control valve 41 is turned OFF, the spool of this valve is shifted to the right side by a spring 41c provided inside the valve. In this condition, the line 61a is closed, and the pressure remaining in the line 62 is purged to the drain X. On the other hand, when the electrical current to the shift control valve 45 is turned OFF, the spool 45b of this valve is shifted to the left side by a spring 65c provided inside the valve. In this condition, the valve opening between the lines 61d and 64 becomes maximum, and the line pressure PL in the line 61d is supplied through the line 64 to a side port of the shift restriction valve 43.

With respect to the shift restriction valve 43, the line 62b is relieved of the pressure while the line 64 receives the line pressure PL. As a result, the spool 43a of the shift restriction valve 43 is shifted to the left side, and the position of the spool in the valve becomes as shown in FIG. 4.

As the valve is open between the line 65 and the line 61c, which are charged with the line pressure PL, as shown in the drawing, the line pressure PL is supplied to a mechanism which comprises a pitot tube. In this embodiment, the hydraulic oil is supplied through the line 65 to an oil supply pipe 52 and then to a pitot flange 51. As the pitot flange 51 is directly connected to the output shaft of the engine, the hydraulic oil 54 accumulating in the oil chamber of the flange is drawn and rotated along with the pitot flange 51, which is rotated by the engine, because of the viscosity of the oil. As the detector portion at the tip of the pitot tube 53 is positioned in the hydraulic oil against the rotational direction of the flange, the pitot tube 53 detects the dynamic pressure which corresponds to the flow speed of the rotating oil.

In this way, when there is a breakdown in the hydraulic control. circuit, a correspondent pressure PD which corresponds to the rotational speed of the engine is sent from the pitot tube 53 through a line 66 to the shift restriction valve 43, not by an electrical means but by this mechanical means, which utilizes the dynamic pressure of the fluid. This pressure PD is then supplied as a signal pressure through a line 67 to the clutch pressure control valve 42.

The clutch pressure control valve 42 includes the spool 42*a*, which is biased rightward by the spring 42*b* as mentioned above. The position of the spool 42*a* is controlled by the valve control pressure supplied through the line 62*a* in the normal operating condition. However, when there is a breakdown, as the valve control pressure is not supplied from the line 62*a*, the position of the spool 42*a* is now controlled by the correspondent pressure PD, which is supplied into the oil chamber 42*c* of this valve. In this way, the valve opening between the line 61*b* and the line 63 is controlled in correspondence to the correspondent pressure PD to adjust the line pressure PL so as to set the clutch control pressure, which is then supplied through the line 63 to the clutch 5.

In other words, the correspondent pressure generating means generates mechanically the pressure (correspondent pressure) which corresponds to the rotational speed of the engine. When there is a breakdown in the electrical control system or the hydraulic control circuit, this correspondent pressure is supplied as a signal pressure to the clutch pressure control valve 42 so that the line pressure can be adjusted in correspondence to the rotational speed of the engine for setting the clutch control pressure.

With this hydraulic control circuit, which is designed for controlling the clutch as described above, when there is a breakdown, the clutch engagement control is still carried out in the following manner. When the rotational speed of the engine is relatively low, for example, the vehicle is in idling, the correspondent pressure (pitot pressure) generated is relatively low. In this condition, the valve opening between the line 61*b* and the line 63 is relatively small, so the clutch is kept in the disengaged condition, and the vehicle will not start. When the accelerator pedal is stepped down a little to increase the rotational speed of the engine a little, the valve opening increases accordingly, and the clutch is engaged in half way, so the vehicle starts gradually. Furthermore, when the accelerator pedal is stepped down deeply to increase the rotational speed of the engine further, the correspondent pressure (pitot pressure) increases accordingly, and the above mentioned valve opening also increases. In this condition, the clutch is engaged completely, so the vehicle is in the normal driving condition.

In the above embodiment, the correspondent pressure generating means, which supplies to the clutch pressure control valve the correspondent pressure that corresponds to the rotational speed of the engine when there is a breakdown, comprises a pitot tube. This is only an example, and the present invention is not limited to this embodiment. For example, a throttle can be provided on the discharge oil passage of the regulator which produces the line pressure by adjusting the discharge pressure of the oil pump as in the invention described in Japanese Patent Application No. H10(1998)-57827, which was applied by the same applicant as this patent application. With this throttle, the upstream pressure which corresponds to the rotational speed of the engine is bypassed in the normal operating condition, and when there is a breakdown, by closing the bypass oil passage, this pressure can be drawn and used. In this way, the correspondent pressure generating means can be also realized.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clutch hydraulic controller comprising:

a hydraulic actuator, which engages and disengages a clutch;

regulator valve means, which adjusts and sets a line pressure;

an electrically controlled valve, which produces a valve control pressure in correspondence to an electrical control signal;

correspondent pressure generating means, which produces mechanically a correspondent pressure that corresponds to rotational speed of an engine;

a clutch pressure control valve, which adjusts said line pressure by using said valve control pressure or said correspondent pressure and supplies this adjusted line pressure to said hydraulic actuator;

a shift restriction valve, which draws selectively either said valve control pressure or said correspondent pressure; and fault determining means, which determines existence of a fault;

wherein:

as long as said fault determining means determines that said hydraulic controller is operating normally, said shift restricting valve restricts said correspondent pressure to said clutch pressure control valve and said line pressure is adjusted by said clutch pressure control valve using said valve control pressure directly, for setting said clutch control pressure; and if said fault determining means determines that there is a breakdown, then said line pressure is adjusted by said clutch pressure control valve using said correspondent pressure being supplied through said shift restricting valve instead of using said valve control pressure, for setting said clutch control pressure.

2. The hydraulic controller as set forth in claim 1, wherein:

said correspondent pressure generating means comprises a pitot flange, which rotates at identical rotational speed as the engine, and a pitot tube, which is provided in said pitot flange and detects dynamic pressure of hydraulic oil in said pitot flange; and said dynamic pressure is used as said correspondent pressure.

3. The hydraulic controller as set forth in claim 1, wherein:

a signal pressure is supplied to said shift restriction valve from a shift control valve which comprises a linear solenoid valve for actuation control; and when electrical current to this linear solenoid valve is turned off, said signal pressure is supplied at a maximum pressure to said shift restriction valve so that said shift restriction valve selectively draws said correspondent pressure, which is then supplied to said clutch pressure control valve.

4. The hydraulic controller as set forth in claim 3, wherein:

said shift control valve is normally used for speed change control, and pressure used for speed change control is equal to or smaller than said maximum pressure; and when said pressure for speed change control is supplied to said shift restriction valve, said shift restriction valve selectively draws said valve control pressure and supplies said valve control pressure to said clutch pressure control valve.

5. The hydraulic controller as set forth in claim 3, wherein:

said electrically controlled valve comprises a linear solenoid valve, and when said electrical control signal is turned off, said valve control pressure becomes nil; and said valve control pressure is supplied to said shift restriction valve for actuation control.

6. The hydraulic controller as set forth in claim 5, wherein:

if said signal pressure is supplied at a maximum pressure to said shift restriction valve because electrical current to said shift control valve is turned off, and if said valve control pressure, which acts on said shift restriction valve, is nil because the electrical current to said electrically controlled valve is turned off, then said shift restriction valve selectively draws said correspondent pressure, which is then supplied to said clutch pressure control valve.

\* \* \* \* \*